B. S. THOMPSON.
GAGE.
APPLICATION FILED OCT. 23, 1918. RENEWED AUG. 19, 1919.
1,318,934.
Patented Oct. 14, 1919.
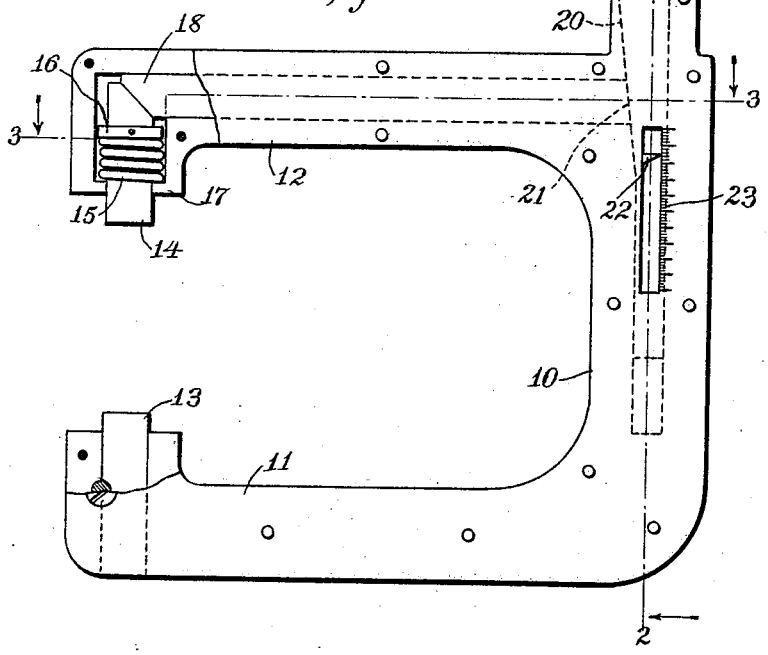
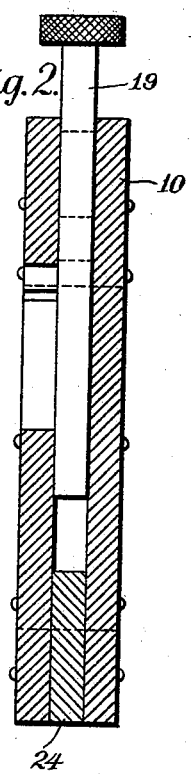
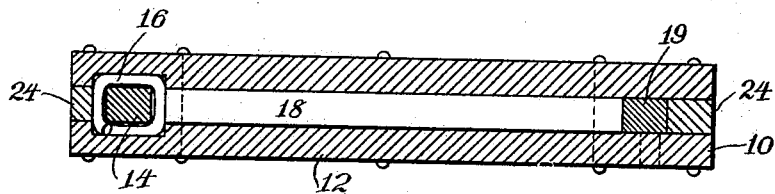
WITNESSES
INVENTOR
Boyd S. Thompson
BY
ATTORNEYS

UNITED STATES PATENT OFFICE.

BOYD S. THOMPSON, OF GRAND RAPIDS, MICHIGAN.

GAGE.

1,318,934. Specification of Letters Patent. Patented Oct. 14, 1919.

Application filed October 23, 1918, Serial No. 259,354. Renewed August 19, 1919. Serial No. 318,574.

*To all whom it may concern:*

Be it known that I, BOYD S. THOMPSON, a citizen of the United States, and a resident of Grand Rapids, in the county of Kent and State of Michigan, have invented a new and Improved Gage, of which the following is a description.

My invention relates to a device for use in the gaging of machine parts. The general object of the invention is to provide a tool having the advantages of the solid gage in the simplicity and facility of manipulation and the approximate advantages of the micrometric calipers in affording a wide range of adjustment.

Reference is to be had to the accompanying drawings forming a part of this specification, it being understood that the drawings are merely illustrative of one example of the invention.

Figure 1 is a side elevation of a gage embodying my invention, parts being broken away;

Fig. 2 is a transverse vertical section on the line 2—2, Fig. 1;

Fig. 3 is a horizontal section indicated by the line 3—3, Fig. 1.

In carrying out my invention in accordance with the illustrated example, the tool is formed with a U-shaped frame or yoke 10 presenting a lower arm 11 and an upper arm 12, the former carrying the relatively fixed anvil 13. The terminal of the upper arm has a plunger 14 directly opposite the anvil 13 and movable relatively to the latter to effect the adjustment. A coil spring 15 surrounds the plunger 14 within the terminal of the arm 12, said spring bearing at its upper end against a collar 16 on the plunger, the opposite end of the spring abutting against a flange 17 on said arm so that the tendency of the spring 15 is to retract the plunger 14. The plunger is moved outward against the tension of the spring 15 by a horizontal slide rod 18 extending longitudinally in the arm 12 and adapted to be moved forwardly by an actuating bar 19 in the yoke 10 perpendicularly to said slide bar. The meeting ends of the plunger 14 and slide bar 18 are mitered so that a movement of one tends to slide the other. Also, that side of the actuating bar 19 contacting with the adjacent bar 18 is beveled as at 20 and the adjacent end of the bar 18 is similarly beveled as at 21, whereby a depression of the rod 19 will force the bar 18 forwardly and thereby move the plunger 14 in the direction of the anvil 13. On the actuating bar 19 and the yoke 10 are coacting indicating means, there being a pointer 22 on said actuating rod and a suitable scale 23 on the yoke.

The yoke 10 is made up of opposite side members and interposed spacing elements 24, the whole being suitably riveted or otherwise fastened after the parts are assembled.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. A gage including a U-shaped yoke, an anvil on one arm thereof, a plunger movable in the other arm toward or from said anvil, a spring tending to retract said plunger, a slide bar disposed longitudinally in the arm carrying said plunger, the adjacent ends of said side bar and plunger being beveled, and an actuating bar perpendicular to the said slide at the opposite end from the plunger, the adjacent surfaces of the actuating bar and slide bar being beveled, and coacting indicating means on the said actuating bar and yoke.

2. A gage of the class described including a yoke, an anvil on one arm thereof, a plunger in the other arm of the yoke, and means to move said plunger relatively to the anvil, said means comprising a slide bar at right angles to the plunger and an actuating bar movable at right angles to the slide bar, said slide bar having beveled surfaces at its opposite ends, and the plunger and actuating bar having beveled surfaces in contact respectively with the respective ends of the slide bar.

BOYD S. THOMPSON.

Copies of this patent may be obtained for five cents each, by addressing the "Commissioner of Patents, Washington, D. C."